US007171657B2

(12) United States Patent
Bloch et al.

(10) Patent No.: US 7,171,657 B2
(45) Date of Patent: Jan. 30, 2007

(54) METHOD AND APPARATUS FOR IMPORTING STATIC MEMBERS OF A CLASS

(75) Inventors: Joshua J. Bloch, San Jose, CA (US); Guy L. Steele, Lexington, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 567 days.

(21) Appl. No.: 10/237,885

(22) Filed: Sep. 9, 2002

(65) Prior Publication Data

US 2004/0049763 A1    Mar. 11, 2004

(51) Int. Cl.
*G06F 9/45* (2006.01)
(52) U.S. Cl. .................. 717/152; 717/117; 717/143
(58) Field of Classification Search ........ 717/105–119, 717/136–153
See application file for complete search history.

(56) References Cited

U.S. PATENT DOCUMENTS 6,836,883 B1 * 12/2004 Abrams et al. ............. 717/140

OTHER PUBLICATIONS

Doerig, "Espresso, A Java compiler Written in Java", Boston University, pp. 1-41, 1998.*
Publication XP-002261298, published Jun. 2000, pp. 1, 125-127, 155-156, and 171-172.
Publication entitled "Callable Modules?", by Bengt Richter, published Jul. 24, 2002, pp. 1-5, XP-002261297, http://mail.python.org/pipermail/python-list/2002-july/114758:htm.

* cited by examiner

*Primary Examiner*—Ted T. Vo
(74) *Attorney, Agent, or Firm*—Park, Vaughan & Fleming LLP

(57) ABSTRACT

One embodiment of the present invention provides a system that facilitates importing static members of a class. During operation, the system examines code associated with a compilation unit to locate a static import declaration that identifies one or more static members of the class to import. Upon finding such a static import declaration, the system records the static import declaration in a symbol table used to compile the compilation unit. This allows the names for the one or more static members of the class to appear within the compilation unit without being prefixed with a name for the class.

16 Claims, 3 Drawing Sheets

METHOD AND APPARATUS FOR IMPORTING STATIC MEMBERS OF A CLASS

BACKGROUND

1. Field of the Invention

The present invention relates to the design of programming languages for computer systems. More specifically, the present invention relates to a method and an apparatus for importing static members of a class into a compilation unit, so that the static members can be referred to without prefixes within the compilation unit.

2. Related Art

Many object-oriented programming languages allow classes to export static members, also known as class methods, class variables, and member classes. When a program invokes or accesses a static member from outside its own class, the programmer must specify the static member's class of origin. The requirement to provide these prefixes is a great annoyance to programmers and hinders the readability of the program. The need for such prefixes has historically been regarded as a necessary evil.

For example, in the JAVA™ programming language, when applying functions to arguments of type "float" or "double", it is necessary to write Math.abs(x), Math.sqrt(x), and Math.max(a, b), where "Math" refers to the class whose full name is "java.lang.Math". This is undesirably verbose for numerical code compared to what one can write in languages such as C, Fortran, and Pascal: abs(x), sqrt(x), and max(a, b).

Furthermore, it is desirable in many situations to have a set of named constants. For example, for a traffic light the following named constants are useful: public static final int RED=0; public static final int YELLOW=1; and public static final int GREEN=2. It is undesirably verbose simply to put them in some utility class TrafficLight and refer to them always as TrafficLight.RED, TrafficLight.YELLOW, and TrafficLight.GREEN. Therefore, some programmers have taken to defining such constants in a utility "interface", and then importing such constants into a class by the stratagem of declaring the class to implement the (otherwise vacuous) interface. However, inheriting from an interface to get access to constants in an implementation is a publicly visible operation, and is therefore subject to all the rules for binary compatibility. Moreover, systems that support "Write Once, Run Anywhere" (WORA) applications require all other implementations to inherit the same interface and the same constants, even though other implementations may not require them.

Hence, what is needed is a method and an apparatus that facilitates efficiently importing static members of a class into a compilation unit so that the static members can be referred to without prefixes within the compilation unit, and without affecting the exported Application Programming Interfaces (APIs) of the classes contained in the compilation unit.

SUMMARY

One embodiment of the present invention provides a system that facilitates importing static members of a class. During operation, the system examines code associated with a compilation unit to locate a static import declaration that identifies one or more static members of the class to import. Upon finding such a static import declaration, the system records the static import declaration in a symbol table used to compile the compilation unit. This allows the names for the one or more static members of the class to appear within the compilation unit without being prefixed with a name for the class.

In a variation on this embodiment, a given static member of a class can include: a static method; a static field associated with a constant; or a static field associated with a variable.

In a variation on this embodiment, the static import declaration can include: a single-static-import declaration that imports a single static member of the class; or a static-import-on-demand declaration that imports static members of the class as needed.

In a variation on this embodiment, the class is defined within an object-oriented programming system.

In a variation on this embodiment, the system can additionally import one or more classes for the compilation unit. In this way, a name for a given imported class can be used within the compilation unit without being prefixed with a name for a package containing the given imported class.

In a variation on this embodiment, the system uses a set of name resolution rules to resolve name ambiguities that arise as a consequence of static import declarations. In a further variation, a given name resolution rule gives priority to a single-member-import declaration, which imports a single static member of a class, over a member-import-on-demand declaration, which imports static members of a class as needed.

In a variation on this embodiment, the static import declaration includes the keyword "static".

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Computer System

Figure 1:
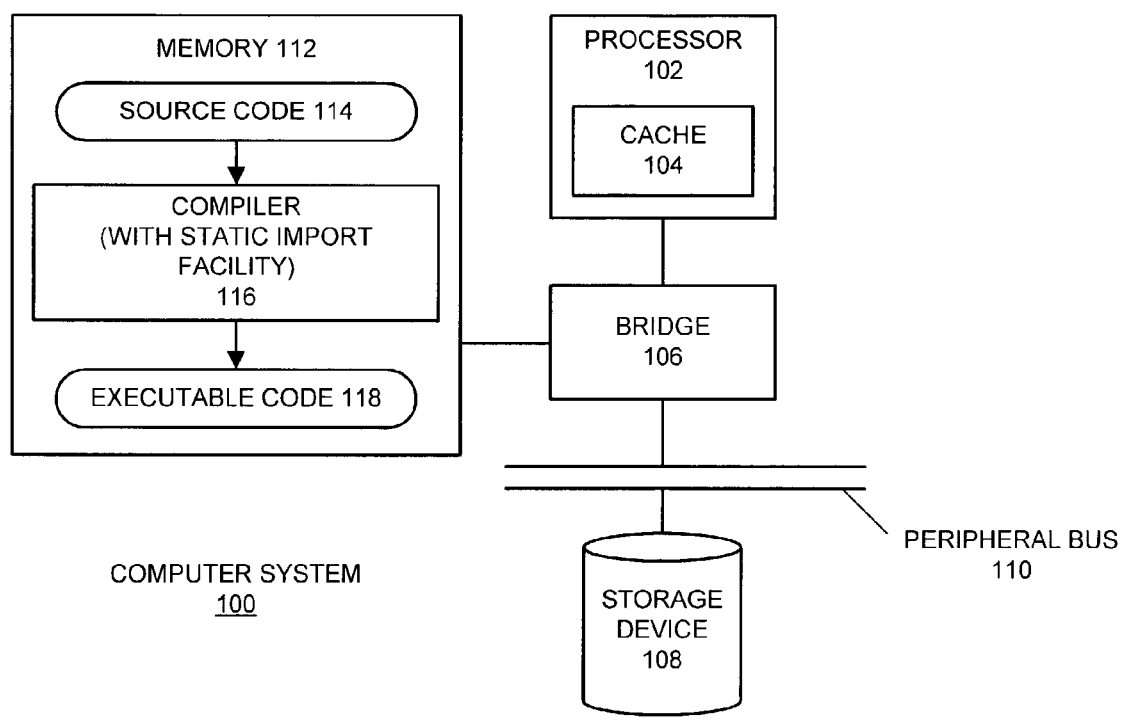
FIG. 1 illustrates a computer system in accordance with an embodiment of the present invention.

FIG. 1 illustrates a computer system 100 in accordance with an embodiment of the present invention. As illustrated in FIG. 1, computer system 100 includes processor 102, which is coupled to a memory 112 and to peripheral bus 110 through bridge 106. Bridge 106 can generally include any type of circuitry for coupling components of computer system 100 together.

Processor 102 can include any type of processor, including, but not limited to, a microprocessor, a mainframe computer, a digital signal processor, a personal organizer, a device controller and a computational engine within an appliance. Processor 102 includes a cache 104 that stores code and data for execution by processor 102.

Processor 102 communicates with storage device 108 through bridge 106 and peripheral bus 110. Storage device 108 can include any type of non-volatile storage device that can be coupled to a computer system. This includes, but is not limited to, magnetic, optical, and magneto-optical storage devices, as well as storage devices based on flash memory and/or battery-backed up memory.

Processor 102 communicates with memory 112 through bridge 106. Memory 112 can include any type of memory that can store code and data for execution by processor 102.

As illustrated in FIG. 1, memory 112 contains compiler 116. Compiler 116 converts source code 114 into executable code 118. In doing so, compiler 116 facilitates importing static members of a class into a compilation unit, so that the static members can be referred to without prefixes within the compilation unit. This process is described in more detail below with reference to FIG. 3.

Note that although the present invention is described in the context of computer system 100 illustrated in FIG. 1, the present invention can generally operate on any type of computing device. Hence, the present invention is not limited to the specific implementation of computer system 100 illustrated in FIG. 1.

Compiler

Figure 2:
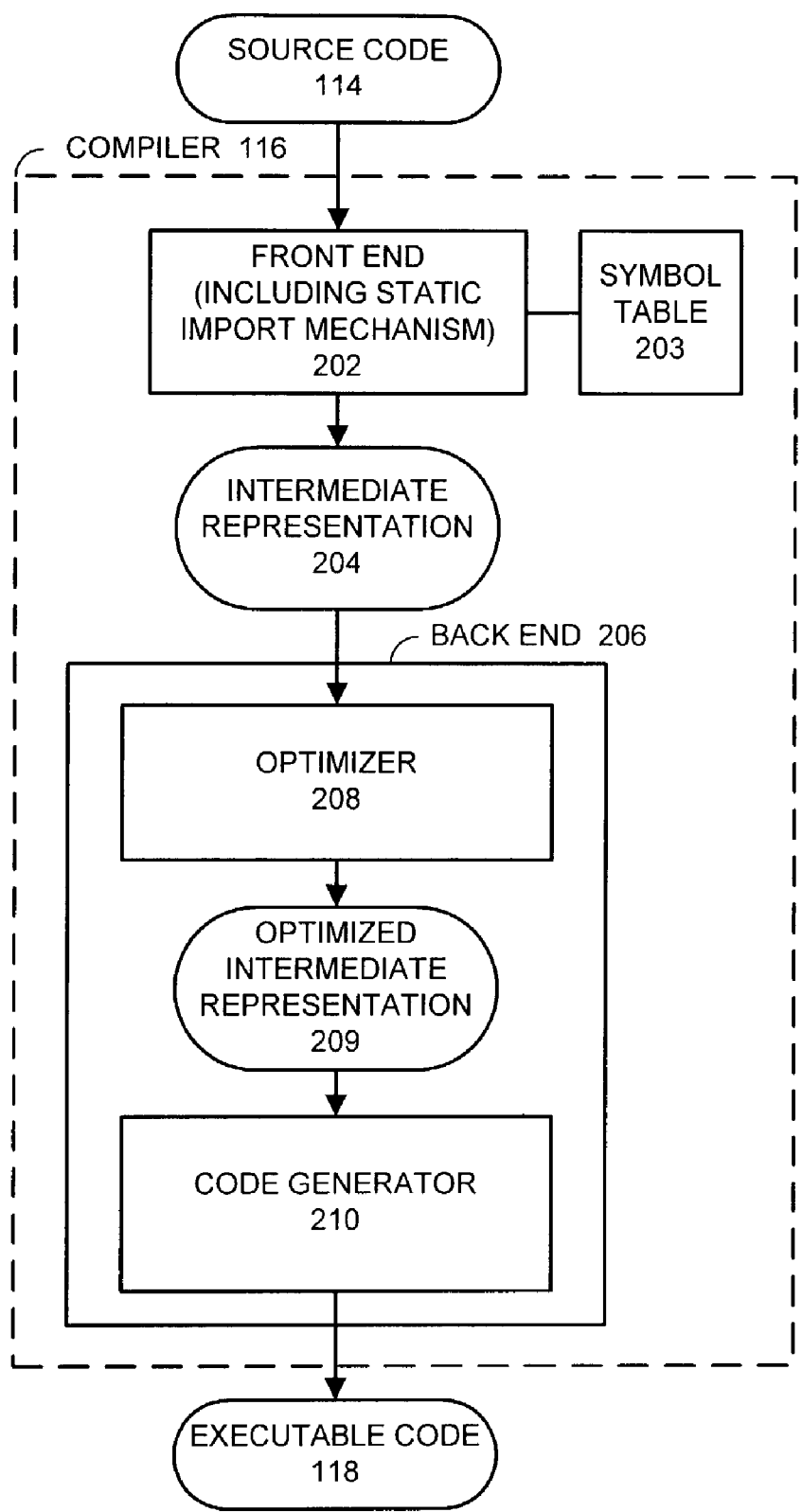
FIG. 2 illustrates the structure of a compiler in accordance with an embodiment of the present invention.

FIG. 2 illustrates the structure of compiler 116 in accordance with an embodiment of the present invention. Compiler 116 takes as input source code 114 and outputs executable code 118. Note that source code 114 may include any computer program written in a high-level programming language, such as the JAVA programming language. Executable code 118 includes executable instructions for a specific virtual machine or a specific processor architecture.

Compiler 116 includes a number of components, including front end 202 and back end 206. Front end 202 takes in source code 114 and parses source code 114 to produce intermediate representation 204.

Intermediate representation 204 feeds into back end 206, which operates on intermediate representation 204 to produce executable code 118. During this process, intermediate representation 204 feeds through optimizer 208, and the resulting optimized intermediate representation 209 is passed to code generator 210.

Note that front end 202 includes a static import mechanism that facilitates importing static members of a class. This static import mechanism works in conjunction with a symbol table 203 as is described in more detail below with reference to FIG. 3.

Process of Using Static Import Declarations

Figure 3:
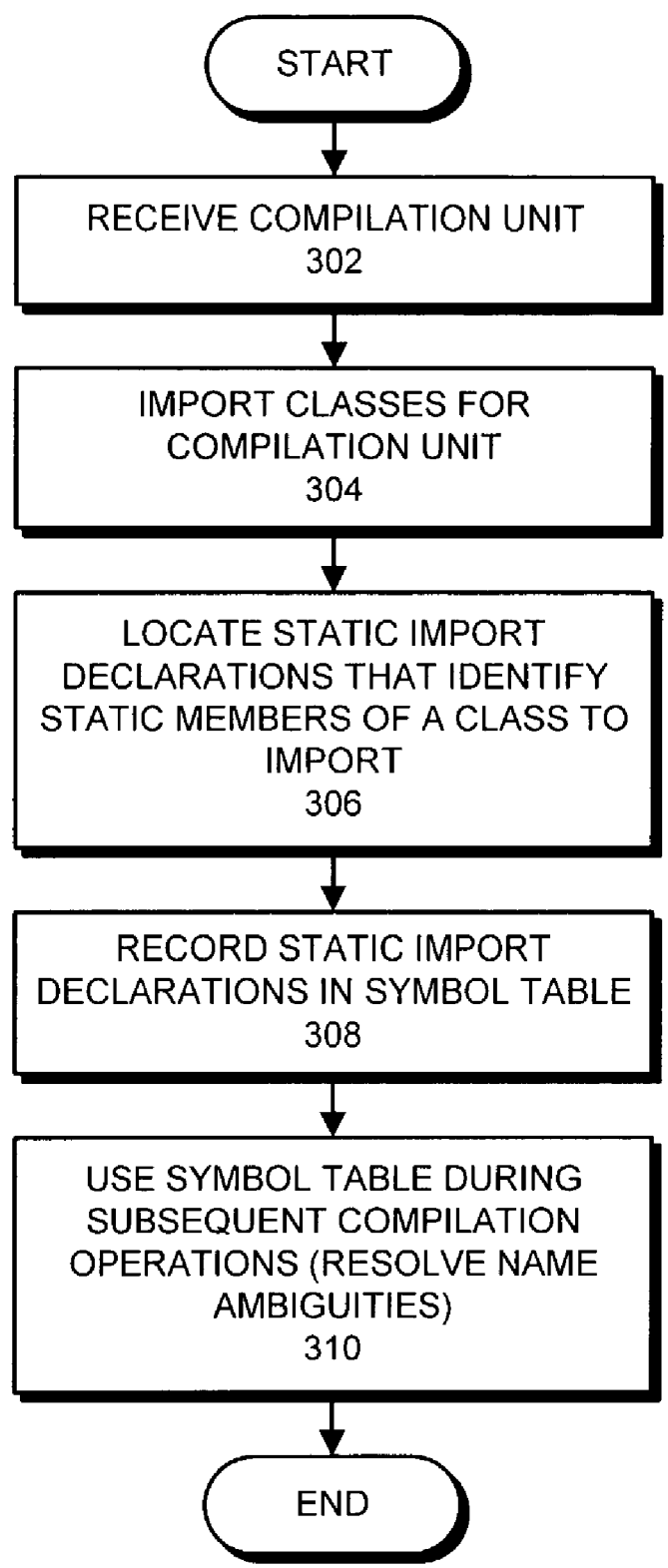
FIG. 3 is a flow chart illustrating the process of using static import declarations in accordance with an embodiment of the present invention.

FIG. 3 is a flow chart illustrating the process of using static import declarations in accordance with an embodiment of the present invention. During operation, front end 202 within compiler 116 receives a compilation unit, which includes code to be compiled and contains (or is associated with) a number of declarations (step 302). (Note that in the JAVA programming language, a compilation unit generally has access to all declarations within its package.) Next, the system can import one or more classes (step 304). This enables code within the compilation unit torefer to a class without having to use a fully qualified name that includes a package name for the class. In one embodiment of the present invention, some classes may be imported automatically while other classes must be imported explicitly.

Next, the system then locates one or more static import declarations that identify static members of a class to import (step 306). Note that a static import declaration can be a "single-static-import declaration" that imports a single static member of the class (such as "java.lang.Math.cos"). Alternatively, a static import declaration can be a "static-import-on-demand declaration" that imports static members of the class as needed (such as "java.lang.Math.*"). Note that in one embodiment of the present invention, the static import declaration includes the keyword "static".

Next, the system records the static import declarations to symbol table 203 (step 308).

The system subsequently uses this augmented symbol table 203, including the additional names, during subsequent compilation operations (step 310). This allows the additional names to be used without having to prefix them with a class name.

Note that certain declarations may give rise to naming ambiguities. For example, the following declarations
  import Integer.*;
  import Long.*;

gives rise to an ambiguity for the method valueOf(String), which is present in both classes, Integer and Long. In order to deal with such cases, the system can use a set of name resolution rules to resolve these naming ambiguities. These names resolution rules may attempt to look at the number and/or type of parameters associated with an occurrence of a method name in an attempt to match the occurrence of the method name with the appropriate method.

These name resolution rules may additionally look to the import declarations for guidance. For example, in one embodiment of the present invention, if the compilation unit additionally includes the declaration
  import static Integer.valueOf;

the system resolves the ambiguity for the name "valueOf" in favor of "Integer.valueOf".

Example Implementation

The following example presents a number of possible changes to the JAVA Language Specification (JLS) to facilitate the static import process (see the JAVA Language Specification, $2^{nd}$ edition, by Bill Joy, Guy Steele, James Gosling and Gilad Bracha, Addison-Wesley (Jun. 5, 2000); ISBN: 0201310082).

One embodiment of the present invention augments the syntax of the import statement (JLS 7.5) to allow two more possibilities.
  SingleStaticImportDeclaration: import static TypeName.Identifier;
  StaticImportOnDemandDeclaration: import static TypeName.*;

The TypeName can be the canonical name of a class or interface type; a compile-time error occurs if the named type does not exist. The named type can be accessible or a compile-time error occurs. For a single-static-import declaration, the Identifier can name a static member of the named type. A compile-time error occurs if there is no member of that name or if the named member is not accessible. A single-static-import declaration in compilation unit c of package p that imports a member named n shadows the declarations of:

- any top-level type named n declared in another compilation unit of p;
- any type named n imported by a type-import-on-demand declaration in c; and
- any static member named n imported by a static-import-on-demand declaration in c.

(The rules for a single-type-import declaration in JLS 7.5.1 can have a similar third bullet added.) A static-import-on-demand declaration never causes any other declaration to be shadowed. (These rules also need to be added to JLS 6.3.1.)

If two single-static-import declarations in the same compilation unit attempt to import members with the same simple name, then a compile-time error occurs, unless the two members are the same member of the same type, in which case the duplicate declaration is ignored.

If a single-static-import declaration imports a member whose simple name is n, and the compilation unit also contains a single-type-import declaration that imports a type whose simple name is n, a compile-time error occurs. (This error occurs even if both declarations refer to the same type, on the grounds that it is confusing to use two different mechanisms to redundantly import the same type.) If a single-static-import declaration imports a member whose simple name is n, and the compilation unit also declares a top-level type whose simple name is n, a compile-time error occurs.

Note that we could choose to have another set of automatic imports (JLS 7.5.3) by specifying that each compilation unit, besides automatically importing all public type names in package java.lang, should also automatically import all public static members of java.lang.Math, thereby making "abs" and "sqrt" and "PI" and so on automatically available in all programs.

The rules in JLS 6.5.2 for classification of an AmbiguousName that is a simple name can be augmented. Between the third and fourth diamond-bulleted subparagraphs, add:

Otherwise, if a static member of that name is declared in the compilation unit containing the Identifier by a single-static-import-declaration, then the AmbiguousName is reclassified as a TypeName, a MethodName, or an ExpressionName according to whether that static member is a class or interface, a method, or a field.

Also, the fifth and sixth diamond-bulleted subparagraphs are replaced by these three paragraphs:

Otherwise, if a type of that name is declared by exactly one type-import-on-demand declaration of the compilation unit containing the Identifier, and not by any static-import-on-demand declaration of the compilation unit containing the Identifier, then the AmbiguousName is reclassified as a TypeName.

Otherwise, if a member of that name is declared by exactly one static-import-on-demand declaration of the compilation unit containing the Identifier, and not by any type-import-on-demand declaration of the compilation unit containing the Identifier, then the AmbiguousName is reclassified as a TypeName, a MethodName, or an ExpressionName according to whether that static member is a class or interface, a method, or a field.

Otherwise, if a type of that name is declared by more than one type-import-on-demand declaration of the compilation unit containing the Identifier, or a member of that name is declared by more than one static-import-on-demand declaration of that compilation unit, or a type of that name is declared by a type-import-on-demand declaration of that compilation unit and a member of that name is declared by a static-import-on-demand declaration of that compilation unit, then a compile-time error occurs.

The rules in JLS 6.5.5.1 for the meaning of a simple type name can be augmented. The fourth bulleted paragraph is replaced by:

Otherwise, if a type with that name is declared in the current compilation unit, either by a single-type-import declaration, by a single-static-import declaration, or by a declaration of a class or interface type, then the simple type name denotes that type.

Also, the sixth and seventh bulleted paragraphs are replaced by these three paragraphs:

Otherwise, if a type of that name is declared by exactly one type-import-on-demand declaration of the compilation unit containing the Identifier, and not by any static-import-on-demand declaration of the compilation unit containing the Identifier, then the simple type name denotes that type.

Otherwise, if a type of that name is declared by exactly one static-import-on-demand declaration of the compilation unit containing the Identifier, and not by any type-import-on-demand declaration of the compilation unit containing the Identifier, then the simple type name denotes that type.

Otherwise, if a type of that name is declared by more than one type-import-on-demand declaration of the compilation unit containing the Identifier, or a member of that name is declared by more than one static-import-on-demand declaration of that compilation unit, or a type of that name is declared by a type-import-on-demand declaration of that compilation unit and a member of that name is declared by a static-import-on-demand declaration of that compilation unit, then the name is ambiguous as a type name. In this case, a compile-time error occurs.

The rules in JLS 6.5.6.1 for the meaning of a simple expression name can be augmented. In the second bulleted paragraph, the second and third diamond-bulleted subparagraphs are replaced by these five subparagraphs:

Otherwise, if the class has a member field of that name: :: If the single member field of that name is declared final . . . :: Otherwise, the expression name denotes a variable . . .

Otherwise, if a field of that name is declared by exactly one non-redundant single-static-import declaration of the compilation unit containing the Identifier: :: If the static field of that name is declared final or the field is a member of an interface . . . :: Otherwise, the expression name denotes a variable . . .

Otherwise, if a field of that name is declared by exactly one static-import-on-demand declaration of the compilation unit containing the Identifier: :: If the static field of that name is declared final or the field is a member of an interface . . . :: Otherwise, the expression name denotes a variable . . .

Otherwise, if a field of that name is declared by more than one static-import-on-demand declaration of the compilation unit containing the Identifier, then the name is ambiguous as an expression name; a compile-time error occurs.

Otherwise, the name is undefined as an expression name; a compile-time error occurs.

In the third bulleted paragraph, the second diamond-bulleted subparagraph is replaced by these five subparagraphs:

Otherwise, if the interface has a member field of that name, the expression name denotes the value of the member field . . .

Otherwise, if a field of that name is declared by exactly one non-redundant single-static-import declaration of the compilation unit containing the Identifier, the expression name denotes the value of the member field . . . :: If the static field of that name is declared final or the field is a member of an interface . . . :: Otherwise, the expression name denotes a variable . . .

Otherwise, if a field of that name is declared by exactly one static-import-on-demand declaration of the compilation unit containing the Identifier: :: If the static field of that name is declared final or the field is a member of an interface . . . :: Otherwise, the expression name denotes a variable . . .

Otherwise, if a field of that name is declared by more than one static-import-on-demand declaration of the compilation unit containing the Identifier, then the name is ambiguous as an expression name; a compile-time error occurs.

Otherwise, the name is undefined as an expression name; a compile-time error occurs.

The second sentence of JLS section 6.5.7.1 is replaced by:

The Identifier can name either at least one method of a class or interface within whose declaration the Identifier appears, or a method imported by a single-static-import declaration or static-import-on-demand declaration within the compilation unit within which the Identifier appears.

JLS section 8.4.6.1 is amended by adding this sentence:

An instance method hides all methods of the same signature that may be imported by single-static-import and static-import-on-demand declarations.

JLS section 8.4.6.2 is amended by adding this sentence:

A static method also hides all methods of the same signature that may be imported by single-static-import and static-import-on-demand declarations.

JLS section 15.12.2.1, the paragraph after the two bulleted paragraphs has a sentence added to it, so that the whole paragraph reads as follows:

The class or interface determined by the process described in section 15.12.1 is searched for all method declarations applicable to this method invocation; method definitions inherited from superclasses and superinterfaces are included in this search. In addition, if the method invocation has, before the left parenthesis, a MethodName of the form Identifier, then the search process also examines all methods that are (a) imported by single-static-import declarations and static-import-on-demand declarations within the compilation unit within which the method invocation occurs, and (b) not hidden at the place where the method invocation appears.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method that facilitates importing static members of a class, comprising:
   receiving a compilation unit containing code to be compiled;
   examining code associated with the compilation unit to locate a static import declaration that identifies one or more static members of the class to import, wherein the one or more static members are defined in a package other than the one to which the compilation unit containing the static import statement belongs; and
   upon finding such a static import declaration, recording the static import declaration in a symbol table used to compile the compilation unit;
   wherein the names for the one or more static members of the class can appear within the compilation unit without being prefixed with a package name for the class.

2. The method of claim 1, wherein a given static member of a class can include:
   a static method;
   a static field associated with a constant;
   a static field associated with a variable; and
   a member class.

3. The method of claim 1, wherein the static import declaration can include:
   a single-static-import declaration that imports a single static member of the class; and
   a static-import-on-demand declaration that imports static members of the class as needed.

4. The method of claim 1, wherein the class is defined within an object-oriented programming system.

5. The method of claim 1, further comprising importing one or more classes for the compilation unit, whereby a name for a given imported class can be used within the compilation unit without being prefixed with a name for a package containing the given imported class.

6. The method of claim 1, further comprising using a set of name resolution rules to resolve name ambiguities that arise as a consequence of static import declarations.

7. The method of claim 6, wherein a given name resolution rule gives priority to a single-member-import declaration, which imports a single static member of a class, over a member-import-on-demand declaration, which imports static members of a class as needed.

8. The method of claim 1, wherein the static import declaration includes the keyword "static".

9. A computer-readable storage medium storing instructions that when executed by a computer cause the computer to perform a method that facilitates importing static members of a class, the method comprising:
   receiving a compilation unit containing code to be compiled;
   examining code associated with the compilation unit to locate a static import declaration that identifies one or more static members of the class to import, wherein the one or more static members are defined in a package other than the one to which the compilation unit containing the static import statement belongs; and
   upon finding such a static import declaration, recording the static import declaration in a symbol table used to compile the compilation unit;
   wherein the names for the one or more static members of the class can appear within the compilation unit without being prefixed with a package name for the class.

10. The computer-readable storage medium of claim 9, wherein a given static member of a class can include:
    a static method;
    a static field associated with a constant;

a static field associated with a variable; and a member class.

11. The computer-readable storage medium of claim 9, wherein the static import declaration can include:
- a single-static-import declaration that imports a single static member of the class; and
- a static-import-on-demand declaration that imports static members of the class as needed.

12. The computer-readable storage medium of claim 9, wherein the class is defined within an object-oriented programming system.

13. The computer-readable storage medium of claim 9, wherein the method further comprises importing one or more classes for the compilation unit, whereby a name for a given imported class can be used within the compilation unit without being prefixed with a name for a package containing the given imported class.

14. The computer-readable storage medium of claim 9, wherein the method further comprises using a set of name resolution rules to resolve name ambiguities that arise as a consequence of static import declarations.

15. The computer-readable storage medium of claim 14, wherein a given name resolution rule gives priority to a single-member-import declaration, which imports a single static member of a class, over a member-import-on-demand declaration, which imports static members of a class as needed.

16. The computer-readable storage medium of claim 9, wherein the static import declaration includes the keyword "static".

* * * * *